T. S. BROWN.
Harvester Rake.
No. 95,191. Patented Sept. 28, 1869.
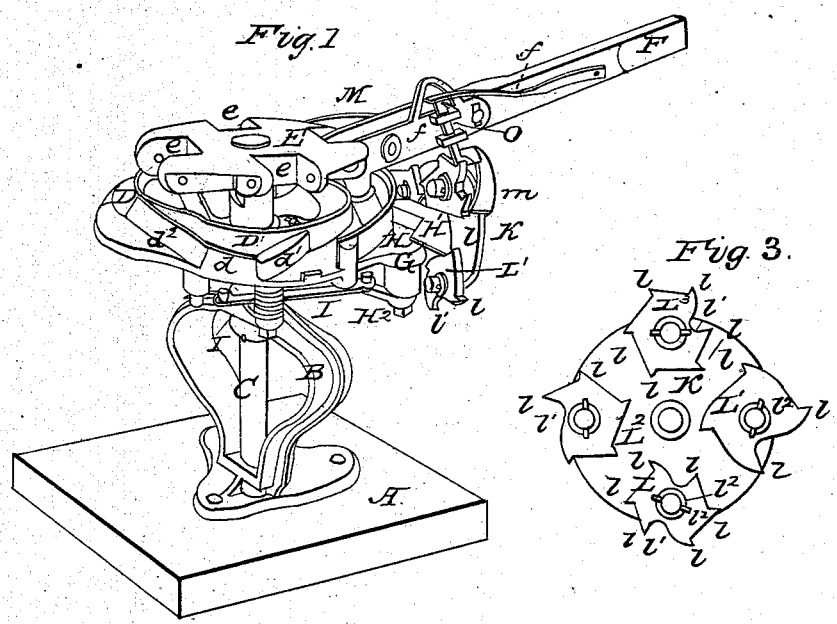
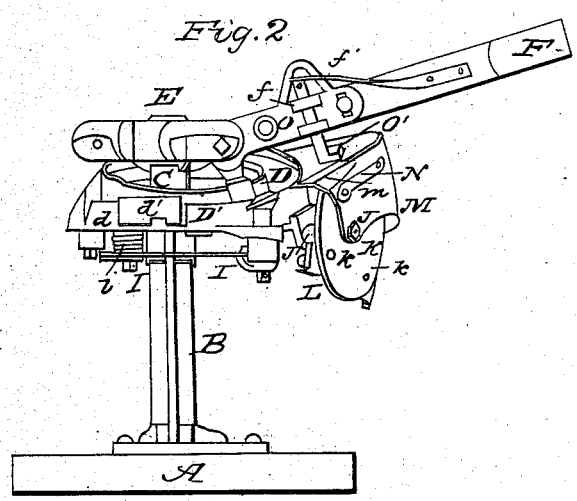

UNITED STATES PATENT OFFICE.

THOMAS S. BROWN, OF POUGHKEEPSIE, NEW YORK.

HARVESTER-RAKE.

Specification forming part of Letters Patent No. 95,191, dated September 28, 1869.

*To all whom it may concern:*

Be it known that I, THOMAS S. BROWN, of Poughkeepsie, county of Dutchess and State of New York, have invented certain new and useful Improvements in Automatic Rakes for Harvesters, of which the following is a full, clear, and exact description, reference being had to the accompanying drawing, making a part of this specification, in which—

Figure 1 is a perspective view of a harvester-rake, showing my improvement applied. Fig. 2 is a side elevation of the same; and Fig. 3 is a face view of the adjustable disk and counters, for regulating the discharge of the gavels, as hereinafter explained.

My invention relates to the continuously-revolving rake and reel, of the class generally known as the Johnston rake, the several arms of which are provided with rake-teeth, and in which all descend to a common level, for gathering the grain into the cutters, and any one or all of which arms may be made to remove the grain from the platform, as the condition of the crop may require.

My improvement consists in combining, with a rake of the class designated, a novel means for automatically controlling the frequency of the discharge of the grain or gavels from the platform, whereby the arms may be made to operate so as to effect the discharge in a continuous swath, or so that every second, third, fourth, fifth, and sixth arm, &c., may be operated to discharge the grain in gavels, according to the character and condition of the crop operated upon.

In the accompanying drawing, A represents any suitable point on the machine for the support of the rake and reel; B, the rake and reel stand or yoke, provided with bearings for the vertical rake and reel shaft C, and supporting the cam D. The cam D is of the class which has two ways or tracks on the side adjacent to the platform, or in that part of it which controls the rake and reel arms during their passage over the platform, and the rakes are made to pass over the grain on the platform without removing it, according as the heel of the rake-arm pursues one or the other of the two ways referred to. D' represents the portion of the cam having the two ways, the outer way being composed of lip or flange d, and switch or gate d¹ d², of the usual construction. E is the rotating head, provided with sockets, represented at e, of any desired number, as four or more; and F represents one of the rake-arms, pivoted in one of the sockets e, and provided with a heel-extension, armed with a friction-roller, F', which traverses the cam D and controls the height of the rake. G represents a flange or lug on the cam-plate, in which is mounted a vertical rock-shaft, H, provided at its upper end with a bent lever or shoe, H¹, and at its lower end with a crank-arm, H², which is connected by a link, I, with a corresponding arm, I', at the lower end of the shaft or pivot which carries the switch or gate d¹.

By this arrangement it will be seen that, when the lever H¹ is moved backward, the switch or latch d is swung outward, opening the inner way of the double track at D', thereby allowing the roller F, on the heel end of the rake-arm, to enter and follow said inner track.

A spring, i, surrounding the switch-pivot, serves to hold the switch in against the main portion of the track, when not thus moved out by the action of lever H¹, as described. A short distance in advance of the flange or lid G is a horizontal stud-shaft, J, formed upon or attached to cam-plate D, and on which is mounted a rotating disk, K, armed with a series of ratchet-wheels or counters, L L¹ L² L³, constructed in form substantially as shown in Fig. 3, and provided with varying numbers of teeth l, and with one or more depressions at l¹, for a purpose which will be presently explained. M is a shield, attached at its forward or inner end to cam-plate D, and at its outer end resting upon and supported by stud-shaft J. This shield is of a width sufficient to cover or protect the disk K and counters L from the falling grain, and is provided on its upper outer edge with a partial cam or downwardly-inclined track, m. N is a spring-plate, attached at one end, n, to shield M, and provided at its opposite end with a pin or bolt, which passes through the shield M at n', and entering one of a series of perforations, k, serves to hold the disk K at any desired point of adjustment. The rake-arms F are provided at f with brackets or bearings, in which is mounted a vertical slide or bolt, O, on the lower end of which is an inclined flanged foot, O'. The bolt O has a pin or shoulder at its upper end, which prevents it from dropping, or being drawn out of its bearings $f$, said bolt or shield being held down by its own gravity, or by means of a spring, arranged as shown at $f'$, or in any suitable way.

The operation of the devices described is as follows: The rotation of the rake-arm carries with it the drop-bolt O until the inclined foot strikes one of the teeth of counters $L^3$, (as represented in the drawings,) thereby rotating the counter on its pivot. The action of the counter lifts the inclined foot and places it upon the incline $m$ on shield M, by means of which it is carried over the switch-lever H without operating the same, until, by the rotation of the counter $L^3$, the foot $O'$ is allowed, once in each revolution, to drop into the depression $l^1$, when the foot $O'$ passes underneath incline $m$, and operates switch-lever $H^1$, opening the switch or gate, and allowing the roller $F'$ to enter the inner track, thereby causing the rake to discharge the grain. The counters are rotated one tooth by each rake-arm passing over it, and, consequently, the counter L, which is provided with six teeth, and with two depressions, $l^1$, will operate the switch twice in each revolution, causing every third rake-arm to operate to discharge the grain.

The counter $L^1$, when placed in position to be acted upon, will operate every fourth arm to discharge the grain, being provided with four teeth and one depression, $l^1$, and so on with counters $L^2$ $L^3$, provided, respectively, with five and six teeth and one depression. The desired counter is brought into position to operate the rake by simply rotating disk K, and is held at the required point by the spring pin or bolt entering one of perforations $k$ in the disk. The counters are prevented from being accidentally rotated or displaced by tension-springs or friction-washers, represented at $l^2$.

By removing one of the counters, or by setting the disk K in such position that the ratchet-wheels or counters are not acted upon, the bolt O will be always allowed to descend and operate the switch, and the grain will thus be discharged continuously, or in a swath behind the machine.

Instead of using the sliding bolts attached to the rake-arms, the counter-wheels may be arranged to act either directly upon said arms or upon fixed spurs attached thereto, in such manner as to raise said arms upon the cam-track $m$, and, if desired, the track $m$ can be extended farther around, so that when the rake-arm is raised upon it by the counter-wheel, said cam $m$ will serve to carry the rake over the platform, clear of the grain, and the outer track, for the heel of the rake-arm, can thereby be dispensed with, if desired. Or, if preferred, the disk and counters may be arranged in such relation to the rake-pivot that the counter-wheel itself will serve to carry the rake-head over the platform, clear of the grain, except when the rake-arms drop into the depressions $l^1$ in the counters, when the rake will operate to remove the grain.

The modifications in construction and arrangement necessary to adapt the combined rake and reel to these last-mentioned modes of operation, will be readily understood without further description.

Having thus described my invention, what I claim as new, and desire to secure by Letters Patent, is—

1. The sliding or drop bolts or latches, attached to the rake-arms for operating the cam switch or gate, substantially as described.

2. The ratchet-wheels or counters, in combination with the slide or bolt on the rake-arms, for regulating the frequency of discharge of the gavels, substantially as described.

3. The inclined track $m$, in combination with the slide or drop bolts, for carrying the latter past the switch-lever without operating the switch, as set forth.

4. The rotating disk, in combination with ratchet-wheels or counters, or their equivalent, for the purpose set forth.

5. The spring pin or bolt, or an equivalent device for holding the disk K and counters L at the desired point of adjustment, as set forth.

6. The shield M, in combination with the disk and counters for protecting them from the falling grain, as set forth.

7. The combination of disk K, counters L, slide-bolt O, inclined way $m$, and switch-lever H, for operating the rake and reel arms, as described.

THOS. S. BROWN.

Witnesses:
ROBT. N. PALMER,
J. R. B. VARICK.